US012643265B2

(12) United States Patent
Schulze

(10) Patent No.: US 12,643,265 B2
(45) Date of Patent: Jun. 2, 2026

(54) SEPARATION FLUID, METHOD AND APPARATUS FOR RECYCLING MULTILAYER MATERIAL USING A PASSIVATION AGENT

(71) Applicant: saperatec GmbH, Bielefeld (DE)

(72) Inventor: Marcus Schulze, Bielefeld (DE)

(73) Assignee: saperatec GmbH, Bielefeld (DE)

( * ) Notice: Subject to any disclaimer, the term of this patent is extended or adjusted under 35 U.S.C. 154(b) by 1283 days.

(21) Appl. No.: 17/106,249

(22) Filed: Nov. 30, 2020

(65) Prior Publication Data

US 2021/0086406 A1 Mar. 25, 2021

Related U.S. Application Data

(63) Continuation-in-part of application No. PCT/EP2019/064180, filed on May 31, 2019.

(30) Foreign Application Priority Data

Jun. 1, 2018 (GB) ...................................... 1809004

(51) Int. Cl.

| | |
|---|---|
| ***B09B 3/00*** | (2022.01) |
| ***B09B 3/70*** | (2022.01) |
| ***B29B 17/02*** | (2006.01) |
| ***B32B 43/00*** | (2006.01) |
| ***C08J 11/06*** | (2006.01) |
| ***C08J 11/08*** | (2006.01) |
| ***C22B 7/00*** | (2006.01) |

(52) U.S. Cl.

CPC ................ *B29B 17/02* (2013.01); *B09B 3/70* (2022.01); *B32B 43/006* (2013.01); *C08J 11/06* (2013.01); *C08J 11/08* (2013.01); *C22B 7/006* (2013.01); *B29B 2017/0268* (2013.01); *B29B 2017/0293* (2013.01)

(58) Field of Classification Search

CPC ............ B29B 17/02; B29B 2017/0268; B29B 2017/0293; B09B 3/80; B32B 43/006; C08J 11/06; C08J 11/08; C22B 7/006; B29K 2023/04; B29K 2705/02; B29L 2031/7166; Y02W 30/62; Y02W 30/80

See application file for complete search history.

(56) References Cited

U.S. PATENT DOCUMENTS

| | | | | |
|---|---|---|---|---|
| 3,300,923 | A | 1/1967 | Behlen | |
| 5,421,526 | A | 6/1995 | Ackermann et al. | |
| 5,840,772 | A * | 11/1998 | Peters | C09D 9/04 524/502 |
| 2002/0033475 | A1 | 3/2002 | Bejarano et al. | |
| 2004/0129372 | A1 | 7/2004 | Huang et al. | |
| 2016/0214368 | A1 | 7/2016 | Kernbaum et al. | |

FOREIGN PATENT DOCUMENTS

| | | | |
|---|---|---|---|
| CN | 103131042 | A | 6/2013 |
| CN | 103402659 | A | 11/2013 |
| CN | 104744724 | A | 7/2015 |
| CN | 106552809 | A | 4/2017 |
| CN | 110446608 | A | 11/2019 |
| EP | 0543302 | A1 | 5/1993 |
| EP | 0965397 | A1 | 12/1999 |
| EP | 2103772 | A2 | 9/2009 |
| GB | 2525858 | A | 11/2015 |
| GB | 2557682 | A | 6/2018 |
| JP | 2013-514882 | A | 12/2010 |
| WO | 01/46305 | A2 | 6/2001 |
| WO | 03/104315 | A1 | 12/2003 |
| WO | 2012/101189 | A1 | 8/2012 |
| WO | 2013003880 | A1 | 1/2013 |
| WO | 2015/169801 | A1 | 11/2015 |
| WO | 2018/109147 | A2 | 6/2018 |

OTHER PUBLICATIONS

SDS Ammonium Phosphates. [accessed on Oct. 16, 2024 from <URL:https://www.sigmaaldrich.com/US/en/sds/sigald/a5764?userType=anonymous>] (Year: 2024).*

* cited by examiner

*Primary Examiner* — Marites A Guino-O Uzzle

(74) *Attorney, Agent, or Firm* — 24IP Law Group USA, PLLC; Timothy R DeWitt

(57) ABSTRACT

A method for recycling of multilayer material is disclosed. The multilayer material (10) comprises a metal layer (30) and at least one further layer (20, 40). The method comprises placing the packaging material in a vat (310) comprising a separation fluid (330) to produce a mixture of metal shreds from the metal layer (30), plastic shreds from the polymer layer (20, 40) and residual components. The separation fluid comprises a mixture comprising a mixture of water, carboxylic acid, carboxylate salt and passivation agent for passivating the surface of the metal layer.

12 Claims, 3 Drawing Sheets

SEPARATION FLUID, METHOD AND APPARATUS FOR RECYCLING MULTILAYER MATERIAL USING A PASSIVATION AGENT

CROSS REFERENCE TO RELATED APPLICATIONS

This application is a continuation-in-part of PCT Application No. PCT/EP2019/064180 filed on May 31, 2019, which claims priority of and benefit to UK Patent Application No 1 809 004.3 filed on Jun. 1, 2018.

BACKGROUND OF THE INVENTION

Field of the Invention

The invention relates to a separation fluid and its use, a method and an apparatus for recycling multilayer material comprising at least one metal layer and at least one further layer. The separation fluid contains a passivating agent which protects the at least one metal layer from chemical reactions.

Brief Description of the Related Art

The use of a microemulsion separation fluid for the separation of laminates or multilayer materials is known, for example, from the Applicant's International Patent Application No. WO 2012/101189, which teaches the separation of layers in a multilayer material from each other. The examples of this WO'189 disclosure are directed towards the separation of multilayer materials used in photovoltaic modules.

The requirement to improve the recycling of laminates used in food packaging has been discussed. For example, an article on "The recycling of Tetra Pak aseptic cartons" by Mario Abreu (found on www.environmental-expert.com) discusses this issue extensively and notes that the recycling of cellulose tissues is possible, but the separation of polyethylene from the aluminium foil is not possible.

U.S. Pat. No. 5,421,526 (Tetra Laval) teaches a method of recovering individual material components, such as metal, plastic and, where applicable, paper, from waste of laminated packaging materials comprising layers of metal, plastic and possibly paper or cardboard. The layers are separated from each other by treating the waste with an organic acid or a mixture of organic acids, selected from among formic acid, acetic acid, propanoic acid, butyric acid and other similar volatile organic acids. The method of this patent is carried out at a high temperature (80° C.), above the flash point of acetic acid (ca. 60° C. at 80% concentration), which not only requires a large amount of energy, but also adds a safety risk. The mixture used is highly aggressive because of the high concentration (80%) of acetic acid. This mixture will attack the aluminium components and lead to formation of hydrogen, as well as a loss of the amount of aluminium recovered in the process.

European Patent Application No. EP 0 543 302 A1 (Kersting) teaches a method for separating aluminium foil from plastic foils, such as PE foils, to enable the recycling of the aluminium. The laminates are placed in a 20% solution of low fatty acids (e.g. acetic acid, propionic acid, formic acid, butanoic acid) and heated to 100° C. for 10-20 minutes. The method is preferably carried out in a closed vessel to operate the liquid at and/or above its boiling point. In addition, an under pressure can be created as the solution is cooled. The industrial feasibility of this method described in EP'302 is questionable, since the whole the waste material in the form of the aluminium and plastic foils together with the solution has to be heated and cooled for every charging cycle. This can be difficult to implement fast enough with large vessels and requires vast amounts of energy.

U.S. Patent Application Publication No. 2004/0129372A1 (Huang) describes a separation method for foil laminated material comprising a foil layer laminated with at least one permeable layer. The separation method of US '372 works by permeating of the separating fluid into the foil-laminated material and dissolving the alumina interlayer between the different permeable layers of the laminate. The separation fluid used in this example is nitric acid well known for dissolving non-noble metals like alumina with the result that the remaining plastic or paper layers can be isolated in separated manner. The separation method disclosed in this document results in the loss of aluminium, which cannot be recovered easily despite that fact that aluminium is a valuable material stream and thus the separation method outlined in US '372 has economic drawbacks.

Similarly, Chinese Patent Application No. CN 104744724 relates to a separation fluid for an aluminium plastic laminate and a method for carrying out the separation of aluminium layers from plastic layers by utilizing the separation fluid. The separation fluid is mainly prepared by mixing 40-200 parts of methanoic (formic) acid and 5-10 parts of dichloromethane and also contains 1-4 parts of a non-ionic surface-active agent. The separation fluid of this application is highly volatile and also contains components that are harmful to the environment.

Chinese Patent Application No. CN 103131042 relates to another type of separating agent for separating aluminium-plastic multilayer material. This type of separating agent is prepared by mixing methanoic (formic) acid and ethanol in a volume ratio of 4:1-1:4. The separating method for an aluminium-plastic composite film by using the separating agent comprises the following steps: mixing the separating agent and water to obtain a separation fluid, and soaking a cleaned aluminium-plastic composite film in the separation fluid; and taking out, cleaning, centrifuging and drying. When the aluminium-plastic separation film is soaked in the solution mixed from the separation fluid and water, aluminium and plastic in the aluminium-plastic composite film can be efficiently separated. In the examples described in this Chinese patent application CN'042, temperatures between 50-80° C. are employed. These are conditions under which the separating agent is flammable and will attack the aluminium, giving rise to safety risks and aluminium loss.

U.S. Patent Application Publication No. 2002/0033475 A1 (Bejarano) discloses a synthetic treatment composition for the recycling of long-life packaging Tetra Brik® aseptic cartons. The composition disclosed in this patent application comprises lactic acid, sodium acetate, cellulose enzymes, α-amylase enzymes, maltose enzymes, citric acid and activated carbon. This composition is used to separate multilayer materials comprising of paper, polyethylene and aluminium.

International Patent Application No. WO 03/104315 A1 (Massura) teaches a recycling method for composite materials having multiple layers comprising paper, aluminium and/or polymeric films. In this method, the composite material is treated with different solvents, like chloroform, tetrahydrofuran, xylene, protonic carboxylic acids or water depending on the characteristics of the adhesives used between the layers. The use of organic solvents, like halogenated media, in this method has, however, a negative environmental impact.

The approach adopted in the prior art for delaminating multilayer materials containing metal layers is the partial or complete dissolution of the bare metal into water-soluble metal salts under acidic oxidative conditions. An exemplary representation of this reaction is given in equation (1):

$$2\ Me(s)+6\ HA \rightarrow 2\ Me^{3+}+6\ A^{-}+3\ H_2(g) \quad (1)$$

in which Me stands for a metal of group 13 of the periodic table (boron group), HA for a protic Lewis-acid and $A^-$ for the corresponding anion of the Lewis-acid. This general reaction is also valid for non-noble or semi-precious metals other than metals of group 13 of the periodic, which have a similar (semi-precious) or more negative (non-noble) standard electrode potential ($E^0$) than that of the standard hydrogen electrode (SHE).

This acidic oxidative metal dissolution approach for the multilayer material comprising metal layers has technical and economic drawbacks: (i) The partial or complete loss of the metal in the output stream reduces the overall efficiency of the recycling process. (ii) The formation of hydrogen gas under acidic oxidative metal dissolution requires protection from explosion and is a safety issue. (iii) The resulting loss of protons, which are the origin of the liberated hydrogen gas, has to be compensated by adding these protons back into the separation fluid in a suitable manner. This compensation will increase the necessary chemical input of the process.

Applicant's co-pending patent application WO 2018/109147 A2 describes a recycling process of multilayer material in which the multilayer material comprises a metal layer and at least one plastic layer. The separation fluid used in this application to enable recycling of the multilayer material contains phosphoric acid and an alkali metal hydroxide to decelerate the dissolution of the metal layer. The handling of these reactive chemicals requires a certain level of safety measures.

SUMMARY OF THE INVENTION

This document describes a recycling process of multilayer materials comprising at least one metal layer that reduces the drawbacks described above. The separation fluid disclosed in this document allows a direct passivation of the metal layer in the multilayer materials after successful delamination of the multilayer materials, so that the delaminated metal layer is protected against further decomposition. Using this passivation method, the metal loss in the recycling process is reduced, the amount of the by-product hydrogen is decreased and the ongoing conversion of the protic Lewis-acids into the corresponding acid residue anions is stopped. The recycling process of this document reduces the risks of involved in the handling of chemicals such as strong acids or bases, like phosphoric acid and sodium hydroxide. Therefore, the recycling process of this document requires fewer safety measures than those used in the current state of art.

A separating fluid and its use for the separation of a metal layer from at least one further layer in a multiple layer material is taught in this disclosure. The method comprises placing the multiple layer material in a vat with a separation fluid for separating the layers in the multiple layer material. The separation fluid comprises a mixture of water, carboxylic acid, carboxylate salt and passivation agent.

The passivation agent results in a passivation of the surface of the metal layer after the delamination and thus prevents further decomposition of the metal layer.

The carboxylic acids are responsible for the delamination of the multilayer packaging material and are water miscible carboxylic acids. The term "water miscible carboxylic acids" is to be understood as carboxylic acids that are water miscible in any ratio with water. The carboxylic acids have a $pK_a$ value between 2 and 8. In one aspect, the $pK_a$ value is between 3 and 5. Those carboxylic acids fulfilling these criteria are C1-C4 fatty acids, namely formic acid, acetic acid, propionic acid and butyric acid. Other C1-C4 acids which are not considered to be fatty acids but fulfill the criteria of water miscibility and $pK_a$ such as but not limited to acrylic acid or 3-chloropropionic acid, are also disclosed by the invention. In one aspect of the invention formic or acetic acid are used. It is known that larger fatty acids (C5 and longer) are not miscible with water in any ratio—e.g. valeric acid has a water solubility of ~5 g per 100 g of water. Therefore, the use of C5 and longer fatty acids is only possible if the water solubility is adjusted by adequate hydrophilic substituents. Furthermore, the C5 and longer fatty acids can accumulate in the other layers, i.e. be taken up by polymer layers, and can only be removed by drying procedures, which are energy intensive. In addition, mixtures of different ones of the carboxylic acids are possible, whereby performance of the delamination is dominated by that carboxylic acid which is the most acidic one and has the greatest amount in the mixture.

The carboxylate salts modify the pH-value of the separation fluid and are soluble in water (solubility>10 g carboxylate salt per 100 g of water at 20° C.). The carboxylate salts have a $pK_b$ value of between 6 and 12. In one aspect, the $pK_a$ value of the carboxylate salt is between 8 and 10.

The counter cation of the carboxylate salt can be either a metal cation or a complex cation. The metal cations are chosen from the alkali or earth alkali metals. Other metal counter ions can be used as long the used counter ions form soluble carboxylate salts and do not interfere with either the delamination process or the passivation process. The complex counter cations comprise more than one atom, for example ammonium ion ($NH_4^+$).

The chosen carboxylate salt corresponds to the used carboxylic acid. In one aspect, the carboxylic acid is acetic acid and the carboxylate salt could therefore be an acetate salt of sodium. These form together a sodium acetate-acetic acid buffer system.

Mixtures of different carboxylate salts as well as non-carboxylate salts that modify the pH value of the solution in the right direction are also possible.

The current invention is not limited by the state of matter of the carboxylate salt (liquid or solid). In one aspect of the invention, the carboxylate salt is a solid (at 20° C.). The carboxylate salt may have a melting point below 20° C. and thus would commonly be described as being a liquid.

The passivation agent is in general a phosphate salt, a phosphonate salt, a phosphinate salt, or a mixture of these salts. In one aspect, the passivation agent is a dihydrogen phosphate salt with an alkali metal cation. The chemical base structures of mono-anionic form of phosphate, phosphonate and phosphinate salts are given by the following formulae:

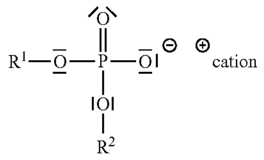

phosphate salt

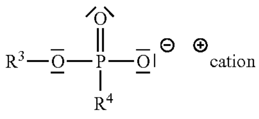

phosphonate salt

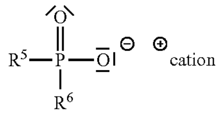

phosphinate salt

In general, the passivation agent is a non-ester, a monoester or a diester of a mono-anionic salt of an oxo acid of phosphorous, namely phosphoric acid, phosphonic acid and phosphinic acid. The substituents $R^1$ to $R^6$ of the passivation agents can be H as well as C1-C4 alkyl chains, namely methyl, ethyl, propyl, iso-propyl, butyl, iso-butyl and tert-butyl. These substituents enable a high solubility in water of the passivation agent. Other substituents could be used as long as the water solubility of the passivation agent is maintained. Other substituents with high hydrophilicity include oligo-, polyethylene glycols or biomimetic phosphates like adenosine triphosphate (ATP). Normally, the substituent pairs $R^1$+$R^2$ and $R^5$+$R^6$ have identical substituents. However, mixtures of different substituents in the substituent pairs $R^1$+$R^2$ and $R^5$+$R^6$ can also be used. In one aspect, the passivation agent is a dihydrogen phosphate salt.

In addition, ester mixtures of mono-anionic salts of an oxo acid of phosphorous are suitable passivation agents. One example are the Hordaphos® products of Clariant, which are mixtures of monoester and diester of phosphoric acid esters. After transformation into mono-anionic salts these ester mixtures are suitable passivation agents. The strong corrosion inhibitor Hordaphos® MDGB is a water miscible mixture of monoalkyl and dialkyl esters of phosphoric acid with alkyl chain lengths between 2 and 4 and is a representative for such a suitable ester mixture.

The counter cation of the passivation agent can be a metal cation or a complex cation. The metal cations are chosen from the alkali or earth alkali metals. Other metal counter ions can be used as long they form soluble passivation agents and do not interfere with the delamination process or the passivation process. Complex counter cations may comprise more than one atom, for example the ammonium ion ($NH_4^+$).

The resulting solubility of the chosen passivation agent should be greater than 0.01 g per 100 g of water at 20° C. In one aspect, the solubility should be larger than 1 g per 100 g of water at 20° C.

Di-anionic salts of the oxo acid of phosphorous, like disodium monohydrogen phosphate, are not used as a passivation agent because the basicity of these salts is normally so high that these substances react with another ingredient of the disclosed separation fluid, namely the carboxylic acid. The reaction of the exemplary chosen disodium monohydrogn phosphate and the carboxylic acid leads to the corresponding mono-anionic salts of the oxo acid of phosphorous and to the carboxylate salt—both ingredients are already covered by the here disclosed invention. However, by significant modification of the $pK_b$ value of the di-anionic salts of the oxo acid of phosphorous through suitable substitution patterns, the use of such passivation agents is made possible.

In one aspect, the chosen passivation agent is the mono-anionic phosphate salt with the substituents $R^1$ and $R^2$ being hydrogen and the counter cation is sodium. This leads to sodium dihydrogen phosphate as passivation agent.

The passivation agent has a $pK_b$ value between 6.0 and 13.0. The $pK_b$ can also expressed as $pK_a$ value by $pK_a+pK_b=14$, so that the passivation agent has as well a $pK_a$ value of between 1 and 8.

The current invention is not limited by the state of matter of the passivating agent (liquid or solid). In one aspect of the invention, the passivating agent is solid (at 20° C.). The passivating agent may have a melting point below 20° C. and thus would commonly be described as being a liquid.

The feature of passivating a metal surface of a multilayer material can be best illustrated by the following two exemplary equations of which eqn. (2) represents the general metal passivation reaction between aluminium and phosphoric acid and eqn. (3) shows the more detailed chemistry of the disclosed invention with aluminium as metal, acetic acid as the carboxylic acid and sodium dihydrogen phosphate as the passivation agent:

$$2\ Al(s)+2H_3PO_4(l)\rightarrow 2\ AlPO_4(s)+3H_2(g) \quad (2)$$

$$Al+CH_3COOH+NaH_2PO_4\rightarrow AlPO_4(s)+CH_3COONa+1.5\ H_2(g) \quad (3)$$

The equations (2) and (3) are chosen because aluminium is the most common metal interlayer used in the multilayer packaging materials. However, the equations are not intended to limit the protection to aluminium. The equations (2) and (3) are also valid e.g. for cooper, tin, lead, zinc, as well as metal alloys.

The substitution of the phosphoric acid in eq. (2) by the combination of the acetic acid and the phosphate passivating salt in eqn. (3) leads to a chemistry which is less harmful because the strong inorganic acid, phosphoric acid, is exchanged against a less acidic acid, acetic acid, and a passivating salt, sodium dihydrogen phosphate, which has no hazards.

The insoluble metal phosphate, phosphonate or phosphinate is deposited on the surface of the metal layer and forms a thin passivation layer protecting the bare metal against further oxidative dissolution. The chemical structure of this thin passivation layer depends on the metal of the metal layer, the used passivation agent and the conditions of the precipitation of the insoluble salt.

The chemical composition of the separation fluid can be obtained by mixing the exact single components. However, the same resulting chemical composition can be achieved by mixing ingredients (precursors) which react afterwards to provide the chemicals of the separation fluid disclosed in this document. It will be understood, for example, that by mixing a carboxylic acid, like acetic acid, and phosphoric acid with the right amounts of a base, like sodium hydroxide, then the chemical reaction would result in a mixture of carboxylate salt (here sodium acetate) and passivating agent salt (here sodium dihydrogen phosphate), water and remaining carboxylic acid. It is intended that such a process would also be covered by this disclosure.

The method is also intended to include the case in which the carboxylic acid and/or precursors of the passivation agent react with bare metals (see equation (1)) to form a suitable carboxylate salt and the final passivation agent. The bare metal for such a case can also be a part of the metal layer of the multilayer material, which is sacrificed to obtain the ingredients for the passivation agent and the carboxylate salt.

Precursors of the carboxylate salt are understood as chemicals, which can be transformed by a one-step reaction into the carboxylate salt disclosed in this invention. Such a one-step reaction could be—but is not limiting of the invention—the reaction of a carboxylic acid with a base (neutralization), a redox reaction of a carboxylic acid with a non-noble metal or an electrochemically conversion of carboxylic acids into the corresponding carboxylate salt.

Precursors of the passivation agent are understood as chemicals, which can be transformed by a one-step reaction into the passivating agents disclosed in this invention. Such a one-step reaction could be—but is not limiting of the invention—the reaction of an oxo acid of phosphorus with a base (neutralization), a redox reaction of an oxo acid of phosphorus with a non-noble metal or a electrochemically conversion of oxo acid of phosphorus into the corresponding passivation salt.

The separation fluid has components that are less harmful to the environment than those known from the current state of art, for example see aforementioned Chinese patent application. In regard to the former application, the volatility of the organic ingredients is lower, which minimizes emission of chemicals and the risk of an explosion, since the separation fluid of this document, as set out below, does not exhibit a detectable flash point. Furthermore, the usage of salts reduces the number of components which are volatile components and thus reduces the complexity in the chemical handling risks of the separation fluid.

The separation fluid of this application also involves no strong inorganic acids or bases and thus reduces the handling risks involved in the use of such chemicals, which can result in strong temperature increases due to neutralization reactions between acids and bases.

The passivation strategy describes in this document increases the overall efficiency of the recycling process in terms of reduced metal loss and reduced chemical input.

The separation fluid disclosed in the invention has a weight percentage of 5-60% of carboxylic acid, 0.05-10% of carboxylate salt, up to 5% passivation agent and 30-95% of water. In one aspect, the separation fluid has a weight percentage of 20-50% of carboxylic acid, 0.5-5% of carboxylate salt, up to 0.02-2% of passivation agent and 40-80% of water. The weight-% range of carboxylic acid covers an optimized delamination performance showing a maximum at around 50 weight-% of carboxylic acid. The amount of carboxylate salt regulates the pH value of the separation fluid and thus is coupled to the amount of the carboxylic acid in the mixture. The weight-% of passivation agent depends strongly on the loading degree and thickness of the metal layer as well as the molecular size parameters of the passivation agent. All of the parameters are influenced strongly by the size of the metal surface of the metallic layer which has to be covered by passivation process. Therefore, no real lower limit of the weight-% of the used passivation agent can be determined. The weight-% of water is the remaining ingredient which fills up to 100%.

The formation of the insoluble metal phosphate, phosphonate or phosphinate, which covers the metal layer after the delamination and leads to the passivation, is pH dependent. Under very acidic conditions, the formation of insoluble metal phosphate, phosphonate or phosphinate is not possible, for instance aluminium phosphate is slightly soluble in strong acids. The pH value of the separation fluid disclosed in this invention is therefore between 1.5 and 5. In one aspect of the invention, the preferred pH value range is chosen between 2 and 3.5. Below pH value of 1.5 the passivation is still working but not as effectively as at higher pH values and the drawbacks mentioned earlier become severe so that the process is no longer economic. pH values higher than 5 leads to a reduced delamination performance of the separation fluid. The pH value has therefore to be adjusted to the separation fluid to balance between reasonable delamination time and efficient passivation afterwards.

The method can also include the sieving/filtering of the separation fluid together with components of the multiple layer material to reclaim the components of the multiple layer material from the separation liquid, and thereafter sorting to obtain a first fraction of metal from the metal layer and a second fraction of plastic from the polymer layer. In some aspects of the invention, a third fraction of a different kind of polymer can be obtained. This enables recycling of the materials from the multiple layer material. The obtained polymers can be extruded, and the metal recovered in the form of metal shreds.

The disclosure also teaches a method for recycling the polymer components as further layers and metal components as metal layer from a packaging material, such as a universal beverage container.

An apparatus for the recycling of packaging material is also disclosed. The apparatus comprises a vat having the separation fluid, a transportation device for transporting the multiple layer material into the vat and a sieving/filtration device for removing separated materials from the combination of the separation fluid and the packaging material.

It will be appreciated that the term "multilayer material" used in this disclosure is intended to encompass objects comprising several layers of material. There is no restriction to thicknesses of the single layers. For instance, the metal layer can be present as a foil or can only be metallized on one of the further layers. The metal layer is a metal which has a similar or more negative standard electrode potential) ($E^\circ$ than that of the standard hydrogen electrode (SHE), normally known as semi-precious or non-noble metals. Metal layers can also comprise of alloys. Such alloys can be alloys between non-noble metals but as well between non-noble and semi-precious or noble metals.

The term further layer covers all materials, which are permeable by liquids, and are, in one aspect, polymer and/or paper layers.

Non-limiting examples of the several layers of materials include objects in which the layers are laminated, bonded or glued together or one of the materials could be deposited on another of the materials. The multiple layer material can include a paperboard layer, as known from beverage containers, but does not need to include a paperboard layer. Other examples of multilayer materials are all kinds of packaging materials which are used for instance in snack packaging and pouch packaging.

The method as described below in a non-limiting embodiment is used for the recycling of laminates in a beverage or food container. It will be appreciated, however, that the method can also find application in the recycling of other laminates used in other applications.

DESCRIPTION OF THE FIGURES

For a more complete understanding of the present invention and the advantages thereof, reference is now made to the following description and the accompanying drawings, in which.

DETAILED DESCRIPTION OF THE INVENTION

The invention will now be described with reference to the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with the feature of a different aspect or aspects and/or embodiments of the invention.

Figure 1:
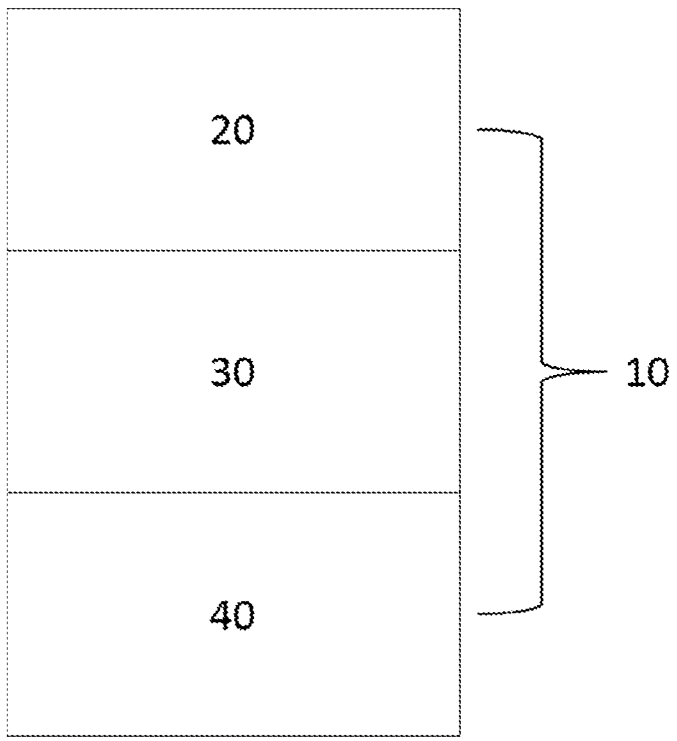
FIG. 1 shows one illustrative example of a laminate used in an aseptic packaging, which is recycled using the separation fluid and the method of this disclosure.

FIG. 1 shows a non-limiting example of a laminate 10 used in an aseptic packaging. The laminate 10 comprises a first polymer layer 20, which is bonded to an aluminium layer 30, which is bonded in turn to a second polymer layer 40. Bonding agents are used between the different layers. Such bonding agents include, but are not limited to, ethylene/acrylic acid copolymer and/or polyurethane adhesives.

The laminate 10 is used, in one aspect of the invention, in an aseptic packaging, such as the ones used for stand-up pouches for beverages such as fruit juice and milk as well as tomato purees and similar fluids. Similar packaging is also used for other foods, such as snack foods, as well as for cosmetics. In some applications, one of the polymer layers is printed on one side, for example with a product description, or indeed on both sides.

In one non-limiting example of the invention, the polymer layer 20 is made of low-density polyethylene (LDPE) and the polymer layer 40 is made of polyethylene terephthalate (PET). The metal layer 30 is made of aluminium. This is not limiting of the invention and other polyolefins or plastics, such as polypropylene (PP), polyamides or polyesters, could be used. Similarly, the metal layer 30 could be an aluminium alloy or another metal.

Some types of packaging comprise only a single polymer layer 20 with the metal layer 30. For example, rejects from the production may only have the single polymer layer 20 with the metal layer 30. Other types of packaging material comprise two polymer layers 20 and 40 made of the same polymer. The teachings of this disclosure are also applicable to these types of multilayer materials and are not restricted to the multilayer materials mentioned.

Figure 3:
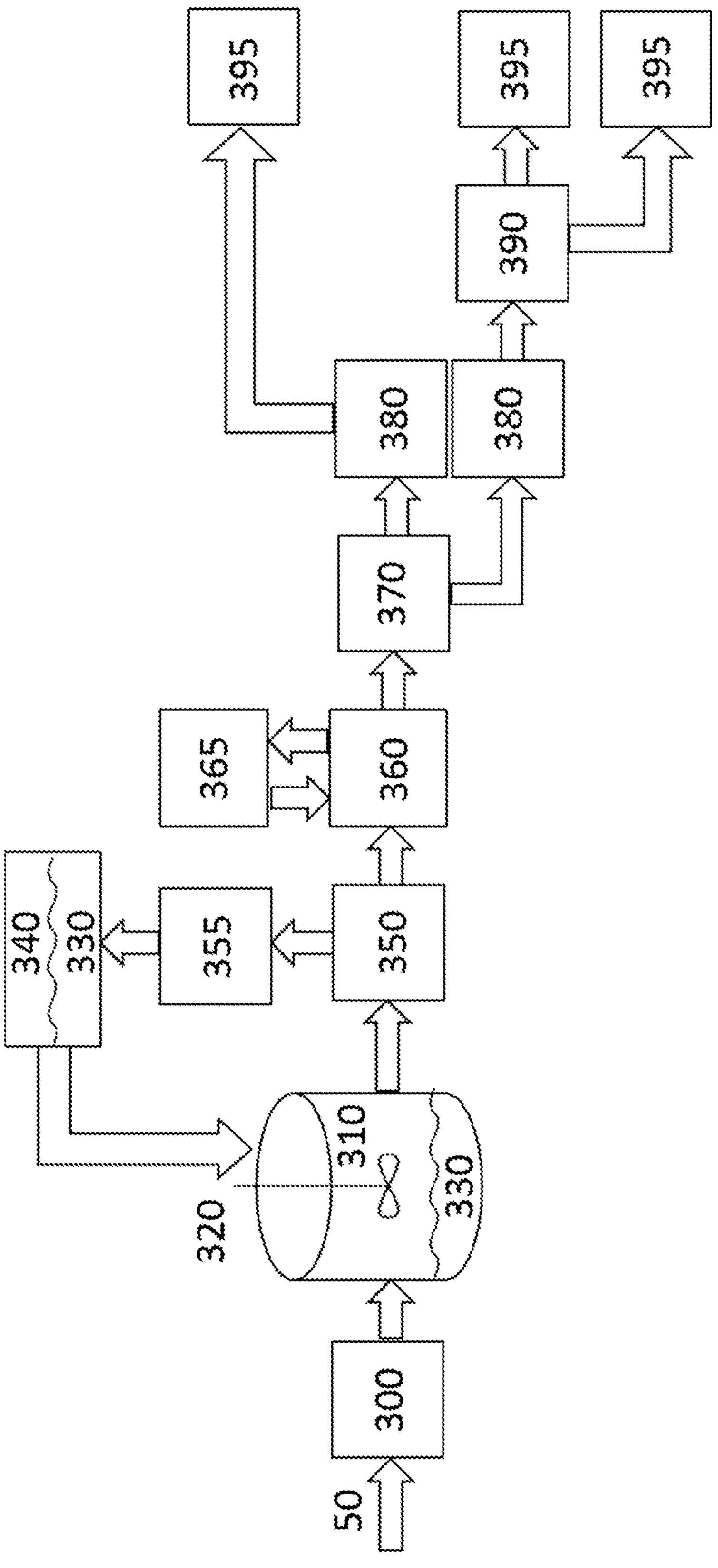
FIG. 3 shows an overview of the apparatus for recycling using the teachings of this disclosure.

FIG. 3 shows an overview diagram, which is an example of a recycling plant for the recycling of the multilayer laminates 10 of this disclosure. It will be appreciated that the plant shown in FIG. 3 is merely exemplary and is not limiting of the invention. The multilayer laminates 10 are constructed as above.

The recycling plant includes a cutting or shredding device 300, which cuts and shreds bales 50 of the packaging material made of the multilayer laminates 10. The cutting or shredding device 300 is followed by a vat 310 with an agitator 320 to stir up and agitate up the contents of the vat 310. The vat 310 contains a separation fluid 330 and a fluid dispenser 340 for dispensing the separation fluid 330 into the vat 310.

The materials can be sieved from the separation fluid 330 in a sieving device 350, and then the sieved materials will be washed with water in a washer 360. A first sorting step for separating components from the sieved materials can be conducted in wet environments, e.g. by use of float-sink-separation or centrifugation techniques, in a wet sorter 370. This results generally in two material streams. In the non-limiting example of the laminate 10 outlined above, one of the two material streams is substantially low-density polyethylene and the other of the material streams is a mixed stream comprising a mixture of aluminium and PET. The two material streams can be washed in a further washing step, if necessary.

The resulting two material streams can be dried in a drying unit 380 and subsequently purified in a dry sorting unit 390. The dry sorting, e.g. to extract the aluminium and the PET from the mixed stream, can be done, for example, by wind-sifting or electromagnetically based techniques. It will be appreciated that the sorting (wet or dry) can also be conducted in a single device or in more than two devices, depending on requirements.

The separation fluid 330 is recycled in a fluid recycling device 355, mostly to be cleaned of impurities by filtration and replenishing consumed chemicals. The washing water is also recycled to clean the washing water in a water-recycling device 365. The recycling includes cross-flow filtration techniques, reverse osmosis and/or liquid-liquid extraction, which also allow reclaiming of at least some of the chemicals of the separation fluid 330 from the washing water.

Figure 2:
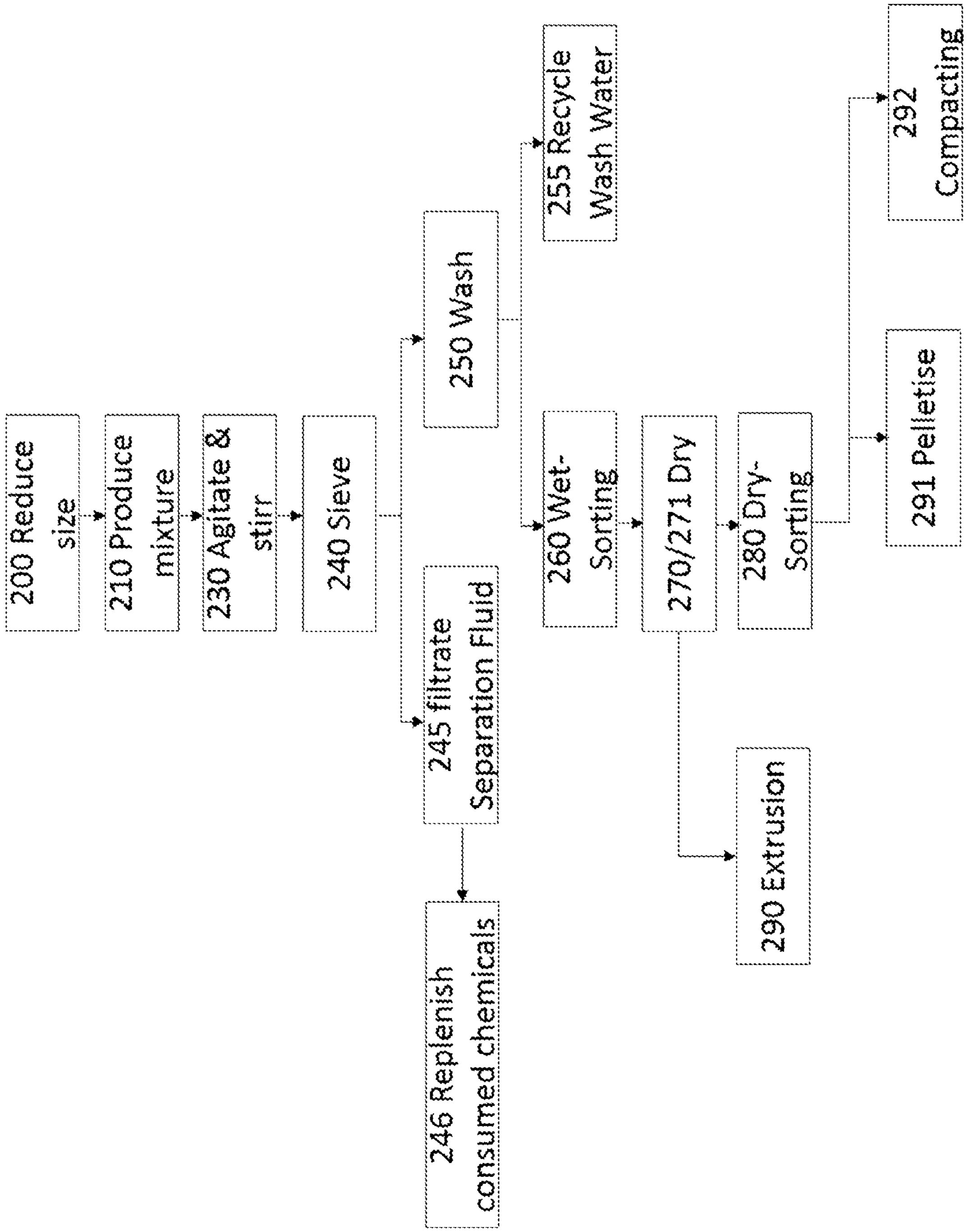
FIG. 2 shows a flow diagram of the method using the teachings of this disclosure.

FIG. 2 shows an outline of the method for recycling of the laminates 10 used in the apparatus shown in FIG. 3. The laminates 10 are collected together as bales 50 of packaging material. The laminates 10 will generally have been pressed together in the bales 50 to reduce their volume. The laminates 10 may have been washed to remove any food rest at a waste refuse collection and/or processing plant. On arrival at the recycling plant, the bales 50 are placed first into the cutting and shredding device 300 for size reduction in step 200. Batches of the cut/shred laminates 10 are then loaded into the vat 310. The agitator 320 mixes the laminates 10 in step 210 with the separation liquid 300 in the vat 310 to produce a mixture.

In step 230, the mixture of the laminates 10 and the separation fluid 330 is further agitated and stirred for a pre-defined treatment time, e.g. 4 hours, leading to a separation of the multilayer laminates 10 into its constituent layers, i.e. the first polymer layer 20 of LDPE, the aluminium layer 30 and the second polymer layer 40 of the PET (in non-limiting example described above). In general, the effect of the separation fluid 330 is to delaminate the first polymer layer 20 of LDPE and/or the second polymer layer 40 and the metal layer 30 to produce metal shred from the metal layer 30 and polymer shred from the first polymer layer 20 and the second polymer layer 40. This is achieved at a given temperature, for example between 20° C. and 90° C., during a treatment time of typically between 30 minutes and 300 minutes. In one aspect of the method, the given temperature is 70° C. In another aspect of the method for universal beverage cartons, the given temperature will be between 30° C. and 50° C. The choice of temperature and process time largely depends on the type of polymer materials and the adhesive bonding agents as well as the thickness of the single layers to be delaminated. The layers being bonded together with bonding agents from ethylene/acrylic acid copolymers delaminate at around 40° C. and those with bonding agents from polyurethane adhesives delaminate at around 70° C.

The mixture of the separation fluid 330 and the separated materials, i.e. LDPE, aluminium and PET can be removed from the vat 310 and sieved in step 240 in the sieve 350 to remove the solid materials, which include the LDPE from the first polymer layer 20, the PET from the second polymer layer 40 and most of the metal shred from the metal layer 30. The separation fluid 330 is then recycled by the device 355. The recycling is carried out by filtration in step 245 and replenishment of consumed chemicals in step 246. The recycled fluid is then placed back into the fluid dispenser 340. The filtration step 245 in device 355 removes substantially all of the solid impurities from the separating fluid 330, including the metal shred, which was not sieved out previously.

The solid material sieved out in step 240 is a mixture of the polymers and aluminium. This resulting material is washed in step 250 in the washer 360, and is then sorted in a wet sorting step 260 in the wet sorter 370 by means of a float-sink-separation or centrifugation technique into a light material, comprising mostly the LDPE, and a dense material, comprising mostly the aluminium and the PET. The light materials and the dense materials are dried separately in the steps 270 (light material) and 271 (dense material). The dried dense material is further sorted in step 280 in the dry sorter 390 by means of wind-sifting or electromagnetic techniques, to obtain an aluminium-rich material and a PET-rich material. It will be appreciated that the sorting (wet or dry) can also be conducted in one step, or in more than two steps depending on the requirements.

The washing water needs to be treated in step 255 with the water recycling device 365 before the washing water is also reused. These treatments include several filtration steps, with regular and cross-flow filtration techniques, reverse osmosis and/or liquid-liquid-extraction, which also allow at least some chemicals from the washing water to be reclaimed and transferred to the fluid recycling device 355 for reuse. In one aspect, the water recycling device 365 comprises a liquid-liquid-extraction unit combined with reverse osmosis.

The LDPE-rich materials can be extruded into granules in step 290. The metal shreds can be pressed into pellets in step 291 for recycling. Similarly, the PET-rich material can be compacted for shipment in step 292. The post treatment steps 290, 291 and 292 can be done in the devices 395, for example by extrusion or pressing machines.

The separating fluid 330 used in the vat 310 and coming from the fluid dispenser 340 comprises a mixture of water, carboxylic acid, carboxylate salt and passivation agent. The carboxylic acids are, for example, in any ratio water miscible C1-C4 monocarboxylic acids, such as formic acid, acetic acid, propionic acid and butyric acid. The carboxylate salt is, for example, the sodium salt of the corresponding carboxylic acid used. As an example, it will be understood that sodium acetate will be used if acetic acid is used as a water miscible monocarboxylic acid. The applied passivation agent here is the sodium dihydrogen phosphate sharing preferably the same counter ion originating from the carboxylate salt. The water is in one aspect of the invention deionised. Mainly the carboxylic acid penetrates the layer to which the metal layer is bonded and afterwards delaminates the aluminium from the adhesive layer of the multilayer material. The passivation agent is added in order to control the side reaction of aluminium dissolution, as discussed above (see eqn. (1)).

The separation fluid 330 is kept between 20° C. and 90° C., and at pH values between 1.5 and 5. The actual values are chosen depending on the properties of the input laminates 10 or other multilayer materials in the packaging material. Usually, a low pH value favours performance of the separation, but also a side reaction which results in the dissolution of the aluminium. Ideally, the method of this disclosure achieves a sufficiently high yield of metal from the metal layer 30 or the polymers from the first polymer layer 20 and the second polymer layer 40 within the treatment time, while keeping the dissolution of the metal layer 30 to a minimum. The minimal dissolution of the metal layer 30 is important for safety reasons, since dissolution of the aluminium also leads to the formation of gaseous hydrogen, which represents an explosion hazard. Furthermore, the overall economy of the process is improved by lower aluminium loss and needed chemical input. The pH value has therefore to be adjusted to the separation fluid 330 to balance between reasonable delamination time and efficient passivation afterwards.

The separation fluid 330 contains the passivation agent sodium dihydrogen phosphate in order to control the content of the dissolved aluminium in the separation fluid 330. The aluminium precipitates as aluminium phosphate under suitable conditions, by adjusting the pH value. The aluminium phosphate is a finely dispersed solid, which can be filtered out from the liquid in the step 245.

The passivation agent induces a thin passivation coverage layer of aluminium phosphate on the aluminium surfaces. These surface phosphates act as an inhibitor, partially passivating the aluminium surfaces from further chemical attack from the carboxylic acid. The reaction products leave the separation fluid 330 in solid form, aluminium phosphate, or in gaseous form, hydrogen. The passivation agent is consumed and has to be replenished. This replenishment happens in the recycling device 355 during the step 246, alongside the replenishment of the other chemicals.

Other Examples of Multiple Layer Materials Used in Packaging

Non-limiting examples of other multiple layer materials used in packaging materials include LDPE (=low-density polyethylene)/aluminium/PET, which is used in coffee packaging and drinks packaging, or PP (=polypropylene)/aluminium/polyester laminates used in coffee packaging and pet food packaging, or LDPE/aluminium/LDPE, which is used in packaging for granulated raw materials for the industry or in tooth paste tubes. Another example are the inner parts (polymer and aluminium) of aseptic universal beverage carton which are usually composed of LLDPE (=linear low density polyethylene)/aluminium/LLDPE.

Composition Examples with Corresponding Application Examples (Laboratory Scale)

The compositions listed below are merely examples of suitable formulations and are not limiting of the invention (all percentages by weight). The corresponding examples listed below to each composition are merely examples of suitable applications and are not intended to be limiting of the invention.

Composition 1

| | |
|---|---|
| Water | 52.9% |
| Acetic acid | 42.5% |
| Sodium acetate | 3.5% |
| Sodium dihydrogen phosphate | 1.1% |

Example 1-1

60 g of LDPE/aluminium/PET material (flakes, 1 $cm^2$, from beverage stand-up pouches) are stirred with 1 kg of separation liquid (composition 1) at 70° C. The detachment of the LDPE form the aluminium is complete after 2 h and the detachment of the PET from the aluminium is complete after 4 h.

Example 1-2

30 g of LDPE/aluminium/PET material (flakes, 3 $cm^2$, from snack food packaging) are stirred with 1 kg of separation liquid (composition 1) at 70° C. The detachment of the LDPE from the aluminium is complete after 2 h and the detachment of the PET from the aluminium is complete after 4 h.

Example 1-3

60 g of LDPE/aluminium/LDPE material (flakes, 2 $cm^2$, from tooth paste tubes) are stirred with 1 kg of separation liquid (composition 1) at 70° C. The detachment of the LDPE from the aluminium is complete after 2 h.

Example 1-4

Three single specimens of PP/aluminium/PET flakes (1 $cm^2$, laminate sample like coffee packaging from foil and converter companies) are shaken with 20 g of separation liquid (composition 1) at 70° C. The detachment of the PP and of the PET from the aluminium is complete after 5 h.

Example 1-5

30 g of LLDPE/aluminium/LLDPE+LLDPE material (flakes, 10 $cm^2$, inner parts of aseptic beverage carton) are stirred with 1 kg of separation liquid (composition 1) at 40° C. The detachment of aluminium from the LLDPE is complete after 2 h.

Example 1-6

20 g of OPA/aluminium/LLDPE material (flakes, 1 $cm^2$, large volume pouch for gastronomic beer storage) are stirred with 1 kg of separation liquid (composition 1) at 70° C. The detachment of aluminium from the OPA and the LLDPE is complete after 5 h.

Examples 1-1 to 1-6 elucidate different packaging materials which can be treated with the separation fluid composition 1 within the scope of the present invention.

Composition 2

| | |
|---|---|
| Water | 53.0% |
| Formic acid | 43.0% |
| Sodium formiate | 2.9% |
| Sodium dihydrogen phosphate | 1.1% |

Example 2-1

Five single specimens of PE/aluminium/PET flakes (1 $cm^2$, laminate sample like coffee packaging from foil and converter companies) are shaken with 20 g of separation liquid (composition 2) at 70° C. The detachment of the PE and of the PET from the aluminium is complete after 1 h.

Composition 3

| | |
|---|---|
| Water | 53.0% |
| Propionic acid | 41.8% |
| Sodium propionate | 4.1% |
| Sodium dihydrogen phosphate | 1.1% |

Example 3-1

Five single specimens of PE/aluminium/PET flakes (1 $cm^2$, laminate sample like coffee packaging from foil and converter companies) are shaken with 20 g of separation liquid (composition 3) at 70° C. The detachment of the PE and of the PET from the aluminium is complete after 10 h.

The compositions 1 to 3 illustrate formulations with different carboxylic acids.

Composition 4

| | |
|---|---|
| Water | 52.7% |
| Acetic acid | 43.4% |
| Potassium acetate | 2.7% |
| Potassium dihydrogen phosphate | 1.2% |

Example 4-1

Five single specimens of PE/aluminium/PET flakes (1 $cm^2$, laminate sample like coffee packaging from foil and converter companies) are shaken with 20 g of separation liquid (composition 4) at 70° C. The detachment of the PE and of the PET from the aluminium is complete after 8 h.

The composition 4 illustrates a formulation with potassium as the counter cation of the carboxylate salt, potassium acetate, and the passivation agent, potassium dihydrogen phosphate.

Composition 5

| | |
|---|---|
| Water | 65.4% |
| Acetic acid | 30% |
| Sodium acetate | 3.5% |
| Sodium dihydrogen phosphate | 1.1% |

Example 5-1

Five single specimens of PE/aluminium/PET flakes (1 $cm^2$, laminate sample like coffee packaging from foil and converter companies) are shaken with 20 g of separation liquid (composition 5) at 70° C. The detachment of the PE and of the PET from the aluminium is complete after 6 h.

Composition 6

| | |
|---|---|
| Water | 35.4% |
| Acetic acid | 60% |
| Sodium acetate | 3.5% |
| Sodium dihydrogen phosphate | 1.1% |

Example 6-1

Five single specimens of PE/aluminium/PET flakes (1 $cm^2$, laminate sample like coffee packaging from foil and converter companies) are shaken with 20 g of separation liquid (composition 6) at 70° C. The detachment of the PE and of the PET from the aluminium is complete after 3.5 h.

Compositions 1, 5 and 6 illustrate formulations with different amounts of carboxylic acid.

Composition 7

| | |
|---|---|
| Water | 77.2% |
| Acetic acid | 20% |
| Sodium acetate | 1.7% |
| Sodium dihydrogen phosphate | 1.1% |

Example 7-1

Five single specimens of PE/aluminium/PE flakes (1 $cm^2$, laminate sample like used beverage carton) are shaken with 20 g of separation liquid (composition 7) at 70° C. The detachment of the PE from the aluminium is complete after 3.5 h.

Composition 8

| | |
|---|---|
| Water | 88.0% |
| Acetic acid | 10% |
| Sodium acetate | 0.9% |
| Sodium dihydrogen phosphate | 1.1% |

Example 8-1

Five single specimens of PE/aluminium/PE flakes (1 $cm^2$, laminate sample like used beverage carton) are shaken with 20 g of separation liquid (composition 8) at 70° C. The detachment of the PE from the aluminium is complete after 5 h.

Composition 9

| | |
|---|---|
| Water | 93.5% |
| Acetic acid | 5% |
| Sodium acetate | 0.4% |
| Sodium dihydrogen phosphate | 1.1% |

Example 9-1

Five single specimens of PE/aluminium/PE flakes (1 $cm^2$, laminate sample like used beverage carton) are shaken with 20 g of separation liquid (composition 9) at 80° C. The detachment of the PE from the aluminium is complete after 7 h.

Compositions 1, 5, 6, 7, 8 and 9 illustrate formulations with different amounts of carboxylic acid.

Composition 10

| | |
|---|---|
| Water | 54.01% |
| Acetic acid | 42.47% |
| Sodium acetate | 3.50% |
| Sodium dihydrogen phosphate | 0.02% |

Example 10-1

80 g of LDPE/aluminium/PET material (flakes, 1 $cm^2$, from beverage stand-up pouches) are stirred with 2 kg of separation liquid (composition 10) at 70° C. The detachment of the PE and of the PET from the aluminium is complete after 4 h.

Composition 11

| | |
|---|---|
| Water | 53.84% |
| Acetic acid | 42.48% |
| Sodium acetate | 3.50% |
| Sodium dihydrogen phosphate | 0.18% |

Example 11-1

Five single specimens of PE/aluminium/PET flakes (1 $cm^2$, laminate sample like coffee packaging from foil and converter companies) are shaken with 20 g of separation liquid (composition 11) at 70° C. The detachment of the PE and of the PET from the aluminium is complete after 4 h.

Compositions 1, 10 and 11 illustrate formulations with different amounts of sodium dihydrogen phosphate as passivation agent.

Composition 12

| | |
|---|---|
| Water | 53.7% |
| Acetic acid | 44.7% |
| Sodium acetate | 0.5% |
| Sodium dihydrogen phosphate | 1.1% |

Example 12-1

Five single specimens of PE/aluminium/PET flakes (1 $cm^2$, laminate sample like coffee packaging from foil and converter companies) are shaken with 20 g of separation liquid (composition 12) at 70° C. The detachment of the PE and of the PET from the aluminium is complete after 2 h. The aluminium flakes showed first indications for corrosion.

Composition 13

| | |
|---|---|
| Water | 53.5% |
| Acetic acid | 43.9% |
| Sodium acetate | 1.5% |
| Sodium dihydrogen phosphate | 1.1% |

Example 13-1

Five single specimens of PE/aluminium/PET flakes (1 $cm^2$, laminate sample like coffee packaging from foil and converter companies) are shaken with 20 g of separation liquid (composition 13) at 70° C. The detachment of the PE and of the PET from the aluminium is complete after 3 h.

Compositions 1, 12 and 13 illustrate formulations with different amounts of sodium acetate as carboxylate salt.

Composition 14

| | |
|---|---|
| Water | 53.05% |
| Acetic acid | 42.5% |
| Sodium acetate | 3.5% |
| Sodium monohydrogen phosphonate ($NaHPO_3H$) | 0.95% |

Example 14-1

Five single specimens of PE/aluminium/PET flakes (1 $cm^2$, laminate sample like coffee packaging from foil and converter companies) are shaken with 20 g of separation liquid (composition 14) at 70° C. The detachment of the PE and of the PET from the aluminium is complete after 4 h.

Composition 15

| | |
|---|---|
| Water | 53.19% |
| Acetic acid | 42.5% |
| Sodium acetate | 3.5% |
| Sodium phosphinate ($NaPO_2H_2$) | 0.81% |

Example 15-1

Five single specimens of PE/aluminium/PET flakes (1 $cm^2$, laminate sample like coffee packaging from foil and converter companies) are shaken with 20 g of separation liquid (composition 15) at 70° C. The detachment of the PE and of the PET from the aluminium is complete after 4 h.

Composition 16

| | |
|---|---|
| Water | 52.5% |
| Acetic acid | 42.5% |
| Sodium acetate | 3.5% |
| 45:55 Mixture monosodium monoethyl phosphate and monosodium diethyl phosphate | 1.5% |

Example 16-1

Five single specimens of PE/aluminium/PET flakes (1 $cm^2$, laminate sample like coffee packaging from foil and converter companies) are shaken with 20 g of separation liquid (composition 16) at 70° C. The detachment of the PE and of the PET from the aluminium is complete after 3 h.

Composition 17

| | |
|---|---|
| Water | 52.9% |
| Acetic acid | 42.5% |
| Sodium acetate | 3.5% |
| Monosodium methylphosphonate (CAS 2914-38-7) | 1.1% |

Example 17-1

Five single specimens of PE/aluminium/PET flakes (1 $cm^2$, laminate sample like coffee packaging from foil and converter companies) are shaken with 20 g of separation liquid (composition 17) at 70° C. The detachment of the PE and of the PET from the aluminium is complete after 4 h.

Compositions 1, 14, 15, 16 and 17 illustrate formulations with different passivation agents in form of phosphate, phosphonate and phosphinate sodium salts.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

REFERENCE NUMERALS

10 Multilayer material
20 First polymer layer
30 Metal layer
40 Second polymer layer
50 Bales
300 Cutting or shredding device
310 Vat
320 Agitator
330 Separation fluid
340 Fluid dispenser
350 Sieving device
355 Fluid recycling device
360 Washer
365 Water-recycling device
370 Wet sorter
380 Drying unit
390 Dry sorting unit
395 Post processing

What is claimed is:

1. A separation fluid for separating multilayer systems containing at least one metal layer and one further layer, the separation fluid comprising a mixture of water, carboxylic acid, carboxylate salt and passivation agent, wherein the passivation agent is a phosphate, phosphonate, phosphinate salt or a mixture thereof, wherein the separation fluid has a pH value of between 1.5 and 5.

2. The separation fluid of claim 1, wherein the carboxylic acid is water miscible in any ratio with water and has a $pK_a$ value of between 2.0 and 8.0.

3. The separation fluid of claim 1, wherein the carboxylic acid is selected from the group of C1-C4 fatty acids consisting of formic acid, acetic acid, propionic acid or butyric acid or mixtures thereof.

4. The separation fluid of claim 1, wherein the carboxylate salt is soluble in water (solubility>10 g carboxylate per 100 g of water at 20° C.) and has a $pK_b$ value between 6.0 and 12.0.

5. The separation fluid of claim 1, wherein a counter cation of the carboxylate salt is or a complex cation, wherein the complex cation comprises more than one atom.

6. The separation fluid of claim 5, wherein the metal cation is one of the alkali metals, earth alkali metals or ammonium.

7. The separation fluid of claim 1, wherein the carboxylate salt is the corresponding Lewis-base of the used carboxylic acid.

8. The separation fluid of claim 1, wherein the passivation agent has a water solubility larger than 0.01 g per 100 g of water at 20° C.

9. The separation fluid of claim 8, wherein a counter cation of the passivation agent is a metal cation or a complex cation.

10. The separation fluid of claim 9, wherein the metal cation is one of the alkali metals, earth alkali metals or ammonium.

11. The separation fluid of claim 1, wherein components of the separating mixture comprise 5-60% by weight of carboxylic acid, with an amount up to 5% by weight of passivation agent and 0.05-10% by weight of carboxylate salt, and 30-95% by weight of water.

12. The separation fluid of claim 1, wherein components of the separating mixture comprise 20-50% by weight of carboxylic acid, 0.02-2% by weight of passivation agent and 0.5-5% by weight of carboxylate salt, and 40-80% by weight of water.

* * * * *